(12) United States Patent
Chang (10) Patent No.: US 7,002,108 B1
(45) Date of Patent: Feb. 21, 2006

(54) ELECTRIC FRYING APPARATUS

(75) Inventor: Chih-Wei Chang, Tainan Hsien (TW)

(73) Assignee: Ya Horng Electronic Co., Ltd., Antin Hsiang (TW)

( * ) Notice: Subject to any disclaimer, the term of this patent is extended or adjusted under 35 U.S.C. 154(b) by 0 days.

(21) Appl. No.: 11/041,597

(22) Filed: Jan. 24, 2005

(51) Int. Cl.
*A47J 37/12* (2006.01)

(52) U.S. Cl. .............. 219/436; 219/430; 219/432; 219/435; 99/403

(58) Field of Classification Search ............ 439/137, 439/145
See application file for complete search history.

(56) References Cited

U.S. PATENT DOCUMENTS

| | | | |
|---|---|---|---|
| 6,225,605 B1 | 5/2001 | Beugnot et al. | 219/432 |
| 6,341,555 B1 | 1/2002 | Chang | 99/337 |
| 6,365,878 B1 | 4/2002 | Lau et al. | 219/430 |
| 6,499,390 B1 | 12/2002 | Huang | 99/331 |
| 2005/0026482 A1 * | 2/2005 | Huang | 439/145 |

* cited by examiner

*Primary Examiner*—Joseph Pelham
(74) *Attorney, Agent, or Firm*—Alan D. Kamrath; Nikolai & Mersereau, P.A.

(57) ABSTRACT

An electric cooking apparatus includes an outer pot body, an inner pot body provided with an electric heating member having two conducting terminals, and a socket including a housing formed with two insertion holes, a movable member movably mounted in the housing, two electric contacts secured on the movable member, and an elastic biasing member mounted between the housing and the movable member. Thus, when the conducting terminals of the electric heating member are inserted into the socket, the electric contacts of the movable member are in close contact with the conducting terminals of the electric heating member by the restoring force of the elastic biasing member, thereby enhancing the electric conducting and heating effect of the electric heating member.

12 Claims, 6 Drawing Sheets

ELECTRIC FRYING APPARATUS

BACKGROUND OF THE INVENTION

1. Field of the Invention

The present invention relates to an electric cooking apparatus, and more particularly to an electric cooking apparatus having a close electric contact relationship.

2. Description of the Related Art

A conventional electric cooking apparatus in accordance with the prior art was disclosed in U.S. Pat. No. 6,365,878-B1 and comprises a heating coil (32), an oil tank (14) for cooking food, and a housing (12), in which the heating coil (32) is in a heat-transferable relationship with the oil tank (14), and the apparatus (10, 200) is adapted to be in an operable state when at least part of the heating coil (32) is received within the housing (12). The electric frying apparatus (10, 200) also includes a frying basket (16) for supporting the food for frying within the oil tank (14), in which the basket (16) is releasably engageable with the housing (12), and the basket (16) includes a protruding part (82) for securing the basket (16) against movement relative to the housing (12). The electric frying apparatus (200) also includes a temperature sensor connected with a liquid crystal display (LCD) 202. The temperature sensor senses the temperature within the oil tank (14) and such a temperature is visually displayed by the LCD (202).

A conventional electric frying pot in accordance with the prior art was disclosed in U.S. Pat. No. 6,499,390-B1 and comprises an outer pot body, and an inner pot. The outer pot body is provided with plural support members and a socket on its bottom base having a micro-switch fixed under to connect the socket. The socket has two notches and an inserting groove on top and a sliding cover inside, a ring electric-heating tube fixed at the bottom of the inner pot, having two thirds embedded therein and two pins protruding at two opposite ends, with an actuating rod longer then the pins fixed between. Thus, when the inner pot is placed in the outer pot body, the actuating rod pushes the sliding cover to move away to let the actuating rod and the pins respectively inserting in the inserting grooves and the notches synchronously with the bottom of the inner pot pressing the lug of the micro-switch to turn on power.

A conventional protective device for a power supply of a frying pan in accordance with the prior art was disclosed in U.S. Pat. No. 6,341,555-B1 and comprises a control lever disposed by side of a plurality of heat-source terminals; a power-supply unit laid on a base, having a power-supply chamber and a slot partitioned inside; a protective shield disposed on an inner top face of the power-supply unit, wherein a resilient device is disposed at a rear end of the protective shield to push the latter forward. When the frying pan is out of use, the protective shield is operated to cover an opening of the power-supply chamber, or when the frying pan is put to use, a user is supposed to place a pan casing on the base, then plug the control lever in the slot to push the protective shield backward to thereby open the opening of the power-supply chamber and allow the heat-source terminals to enter a power-supply jack and turn the power on.

A conventional electrical cooking appliance, notably a fryer, in accordance with the prior art was disclosed in U.S. Pat. No. 6,225,605-B1 and comprises a case (1) forming a housing (2) provided to receive a removable bowl (3), the bowl having lateral walls (4) and a base (5) under which is fixed a shielded heating element (6) having two extremities (7) each terminated by a connection terminal (8). An electric connector (10) is mounted in the case (1), the connector having electrical contacts (12) disposed opposite openings (11) provided to receive the terminals (8) of the shielded heating element (6), during introduction of the bowl (3) into the housing (2). The connector (10) is mounted to be movable in lateral translation relative to the base of the case (1) and the openings (11) have bevel edges (13) provided to guide the terminals (8) of the heating element (6) toward the electrical contacts (12).

However, in the above-mentioned prior art references, when the conducting terminals of the heating element are inserted into the socket to contact with the electrical contacts of the socket, the conducting terminals of the heating element are in loose contact with the electrical contacts of the socket under the condition without application of any external force. The electrical contacts of the socket are often made of metallic elastic conducting plates, so that the conducting terminals of the heating element are in contact with the electrical contacts of the socket stably by elasticity of the electrical contacts. Thus, the conducting terminals of the heating element are easily loosened from the electrical contacts of the socket due to an elastic fatigue of the electrical contacts during a long-term utilization, so that the conducting terminals of the heating element are in poor contact with the electrical contacts of the socket, thereby decreasing the electric conducting and heating effect of the electric heating member.

SUMMARY OF THE INVENTION

In accordance with the present invention, there is provided an electric cooking apparatus, comprising:

an outer pot body;

an inner pot body mounted in the outer pot body and provided with an electric heating member having two conducting terminals;

a socket mounted in the outer pot body and including a housing secured on the outer pot body and formed with two insertion holes aligning with the conducting terminals of the electric heating member of the inner pot body, a movable member movably mounted in the housing, two electric contacts secured on the movable member to move therewith, and an elastic biasing member mounted between the housing and the movable member to push the movable member; wherein the conducting terminals of the electric heating member of the inner pot body are inserted through the insertion holes of the housing and are electrically connected to the electric contacts when the electric contacts are movable to align with the insertion holes of the housing;

the conducting terminals of the electric heating member of the inner pot body are in close contact with the electric contacts of the socket by an elastic force of the elastic biasing member.

The primary objective of the present invention is to provide an electric cooking apparatus having a close electric contact relationship.

Another objective of the present invention is to provide an electric cooking apparatus, wherein when the conducting terminals of the electric heating member are inserted into the socket, the electric contacts of the movable member of the socket are in close contact with the conducting terminals of the electric heating member by the restoring force of the elastic biasing member, thereby enhancing the electric conducting and heating effect of the electric heating member.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–4, an electric cooking apparatus 1 in accordance with the preferred embodiment of the present invention comprises an outer pot body 2, an inner pot body 3, and a socket 4.

Figure 1:
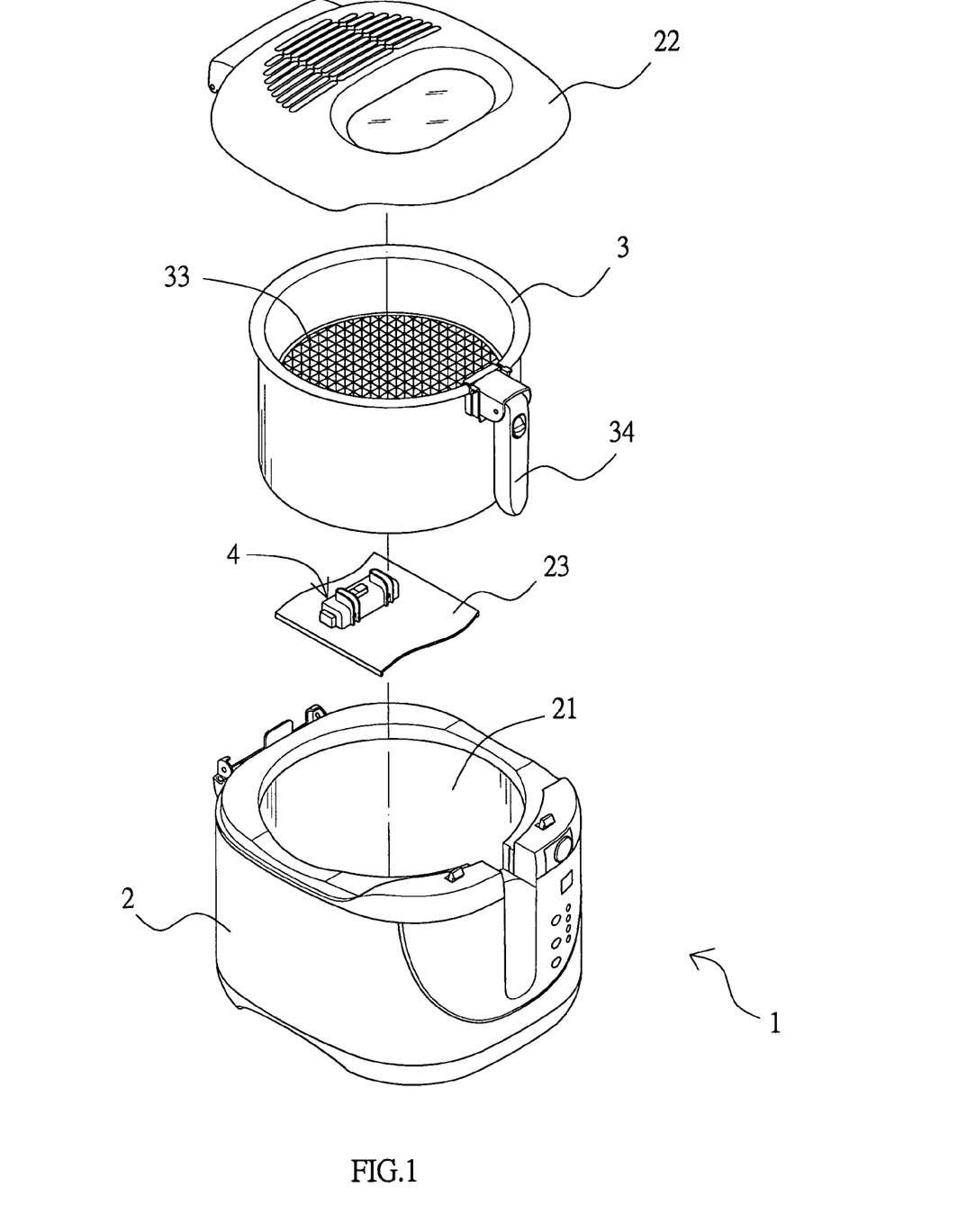
FIG. 1 is a partially cross-sectional exploded perspective view of an electric cooking apparatus in accordance with the preferred embodiment of the present invention.

The outer pot body 2 has an inside formed with a receiving chamber 21. A removable lid 22 is detachably pivoted on the top of the outer pot body 2. A bottom plate 23 is mounted in the receiving chamber 21 of the outer pot body 2.

Figure 2:
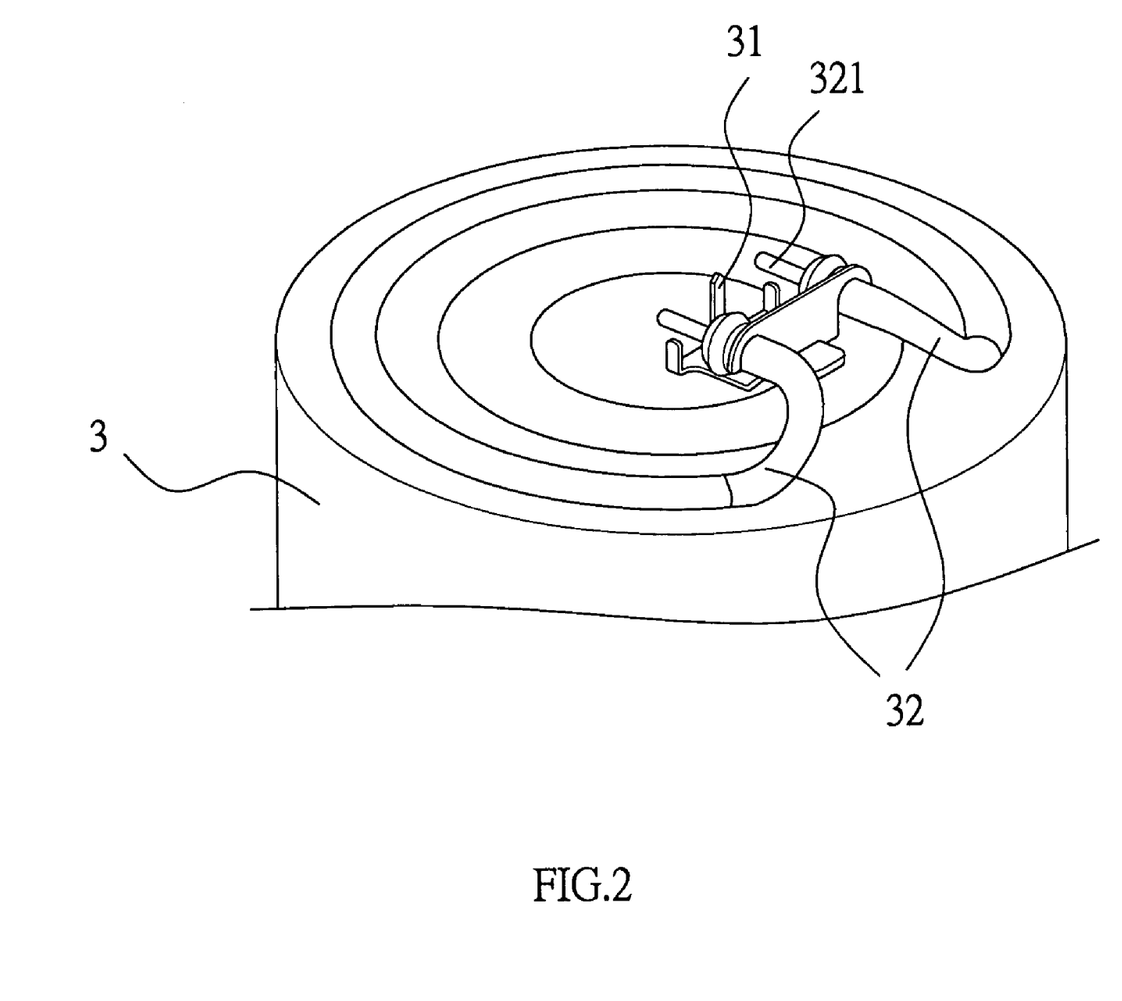
FIG. 2 is a partially perspective view of an inner pot body of the electric cooking apparatus as shown in FIG. 1.

The inner pot body 3 is mounted in the receiving chamber 21 of the outer pot body 2 and has a bottom provided with a push lever 31 and an electric heating member 32 having two conducting terminals 321. A frying basket 33 is movably mounted in the inner pot body 3 has a handle 34 protruding outward from the inner pot body 3.

Figure 3:
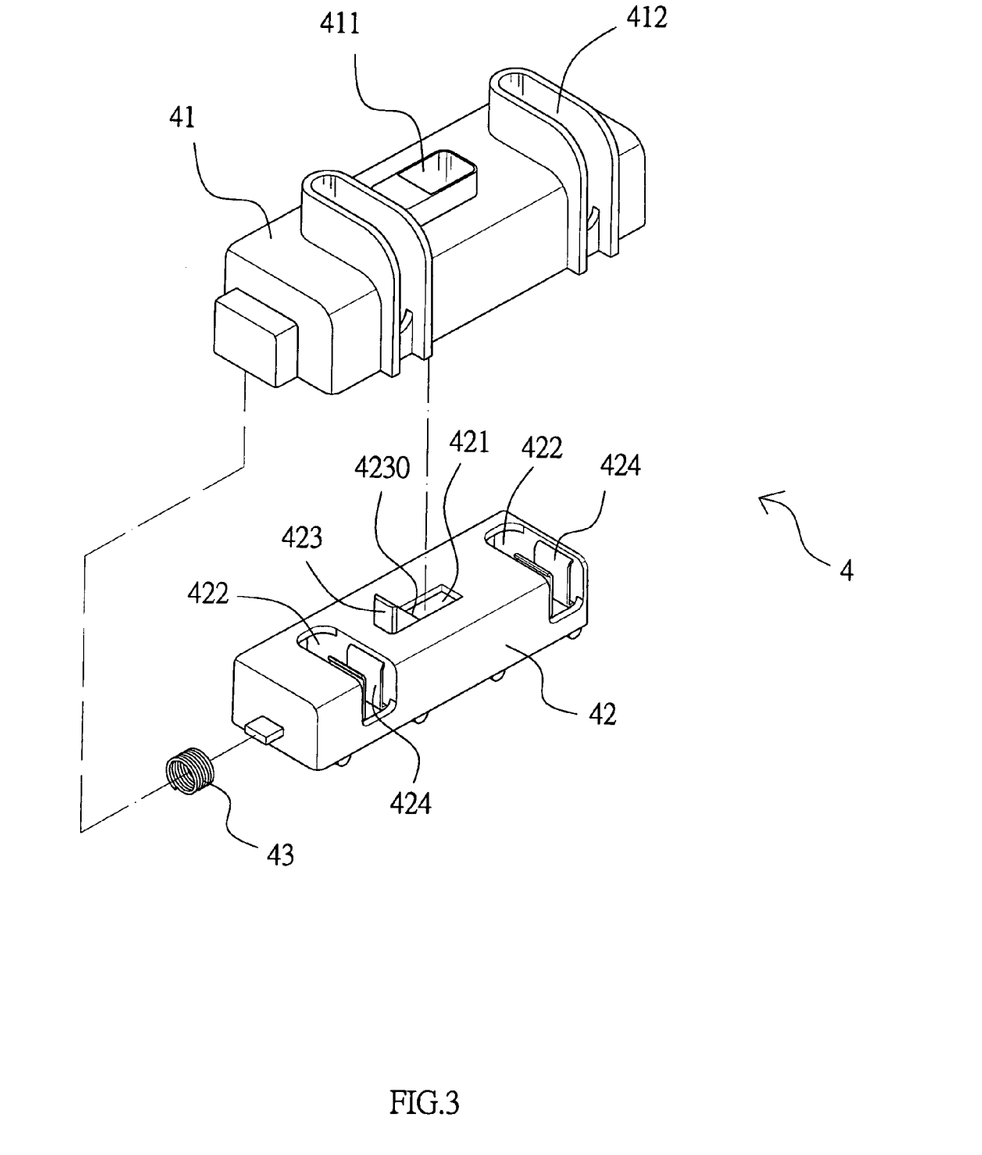
FIG. 3 is an exploded perspective view of a socket of the electric cooking apparatus as shown in FIG. 1.

The socket 4 is mounted on the bottom plate 23 of the outer pot body 2 and connected to the push lever 31 and the conducting terminals 321 of the electric heating member 32 of the inner pot body 3. The socket 4 is connected to a surrounding electric power supply (not shown) and includes a housing 41 secured on the bottom plate 23 of the outer pot body 2, a movable member 42 movably mounted in the housing 41, and an elastic biasing member 43.

The housing 41 of the socket 4 is made of insulating material and formed with two insertion holes 412 aligning with the conducting terminals 321 of the electric heating member 32 of the inner pot body 3 and an opening 411 aligning with the push lever 31 of the inner pot body 3.

The movable member 42 of the socket 4 is formed with two slots 422 aligning with the insertion holes 412 of the housing 41 and a guide hole 421 aligning with the opening 411 of the housing 41. Each of the two slots 422 of the movable member 42 of the socket 4 is provided with an electric contact 424 connected to the electric power supply. The guide hole 421 of the movable member 42 of the socket 4 has a side provided with a guide block 423 for guiding movement of the push lever 31 of the inner pot body 3. The guide block 423 of the movable member 42 of the socket 4 has a side formed with a ramp 4230 to guide movement of the push lever 31 of the inner pot body 3.

The elastic biasing member 43 of the socket 4 is a coil spring mounted between the housing 41 and the movable member 42.

Figure 4:
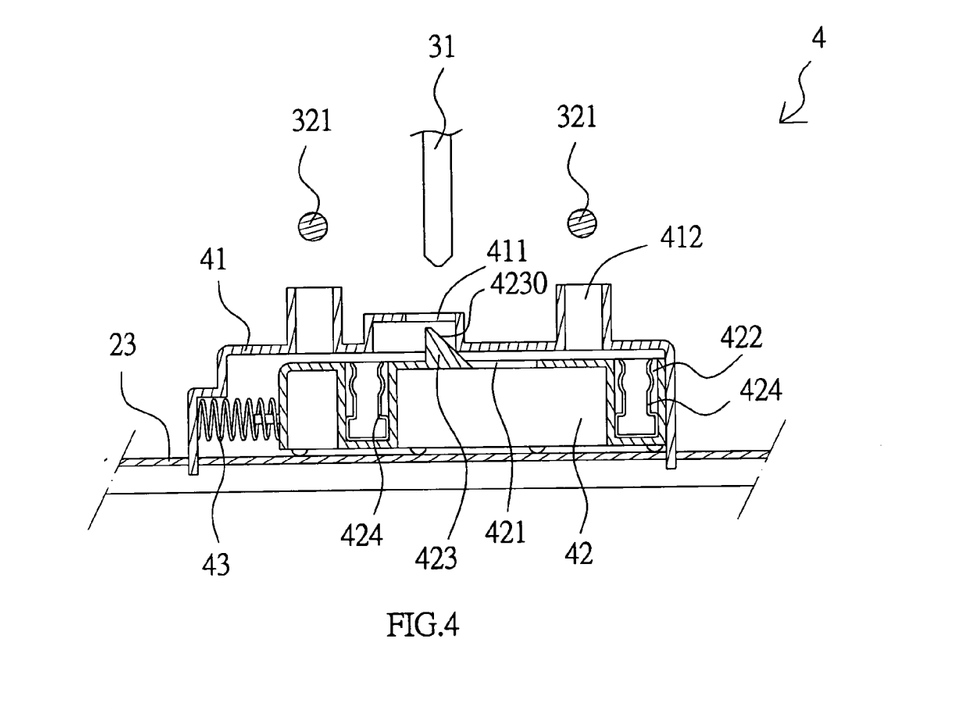
FIG. 4 is a plan cross-sectional assembly view of the electric cooking apparatus as shown in FIG. 3.

As shown in FIG. 4, the movable member 42 of the socket 4 is pushed by an elastic force of the elastic biasing member 43 to move to a shielding position where the slots 422 of the movable member 42 are separated from the insertion holes 412 of the housing 41, so that the insertion holes 412 of the housing 41 are closed by a wall of the movable member 42, thereby preventing a foreign object from entering the two slots 422 of the movable member 42 from the insertion holes 412 of the housing 41.

Figure 5:
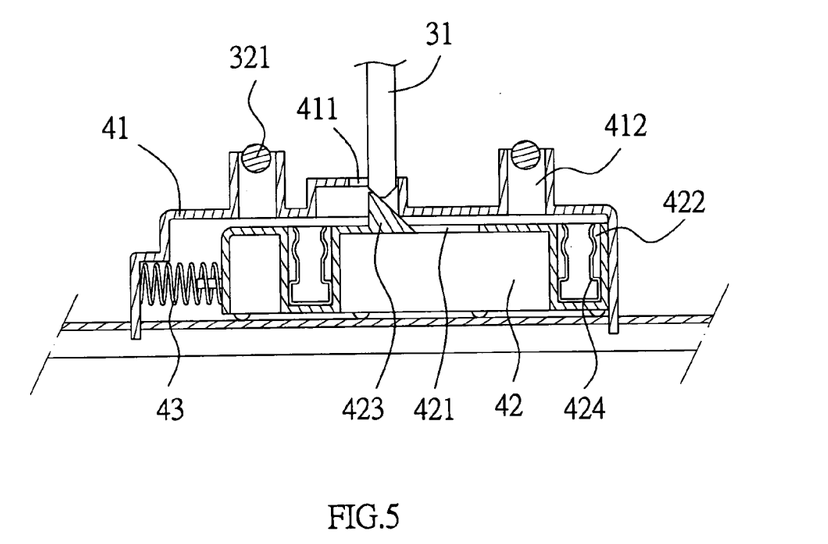
FIG. 5 is a schematic operational view of the electric cooking apparatus as shown in FIG. 4.

As shown in FIG. 5, when the push lever 31 and the conducting terminals 321 of the electric heating member 32 of the inner pot body 3 approach the socket 4, the push lever 31 is first inserted into the opening 411 of the housing 41 and pressed on the guide block 423 of the movable member 42 to push the movable member 42 to move against the restoring force of the elastic biasing member 43 until the slots 422 of the movable member 42 are aligned with the insertion holes 412 of the housing 41.

Figure 6:
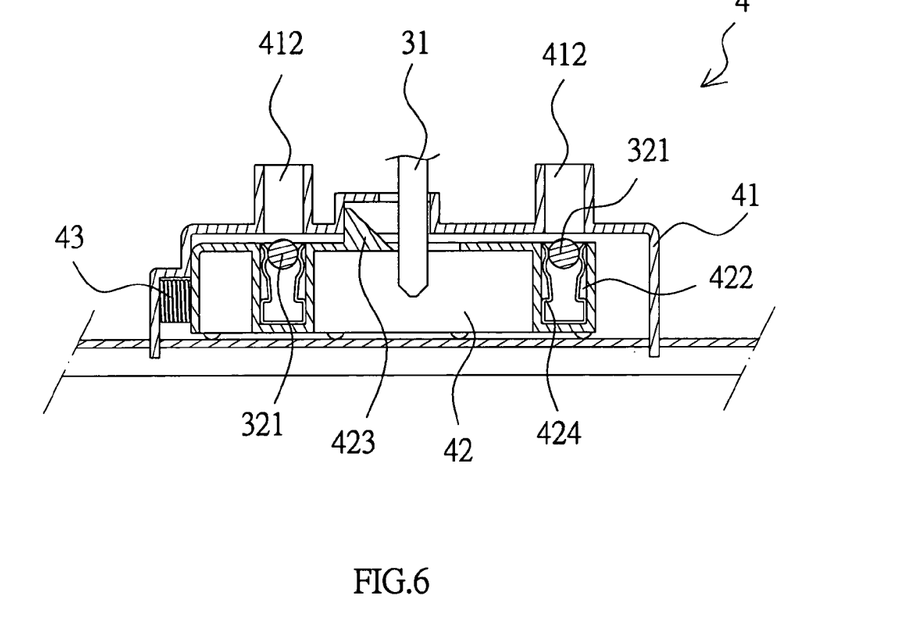
FIG. 6 is a schematic operational view of the electric cooking apparatus as shown in FIG. 5.

As shown in FIG. 6, when the slots 422 of the movable member 42 are aligned with the insertion holes 412 of the housing 41, the conducting terminals 321 of the electric heating member 32 are inserted through the insertion holes 412 of the housing 41 into the slots 422 of the movable member 42 to contact the electric contacts 424 of the movable member 42, thereby electrically connecting the inner pot body 3 to the socket 4. At this time, the conducting terminals 321 of the electric heating member 32 force the movable member 42 to further move against the restoring force of the elastic biasing member 43 successively so as to adjust the relative position between the conducting terminals 321 of the electric heating member 32 and the electric contacts 424 of the movable member 42.

At the same time, the guide block 423 of the movable member 42 is separated from the push lever 31, so that the guide block 423 of the movable member 42 is not contact with the push lever 31. At this time, the conducting terminals 321 of the electric heating member 32 force the electric contacts 424 of the movable member 42 to move against the restoring force of the elastic biasing member 43. Thus, the conducting terminals 321 of the electric heating member 32 replaces the push lever 31 to overcome the restoring force of the elastic biasing member 43.

Figure 7:
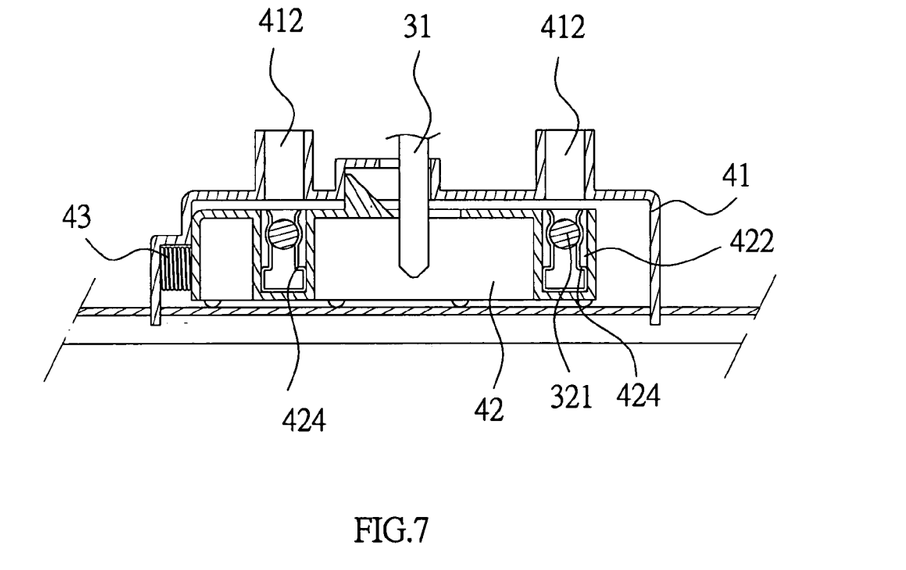
FIG. 7 is a schematic operational view of the electric cooking apparatus as shown in FIG. 6.

As shown in FIG. 7, the electric contacts 424 of the movable member 42 are in close contact with the conducting terminals 321 of the electric heating member 32 by the restoring force of the elastic biasing member 43, thereby enhancing the electric conducting and heating effect of the electric heating member 32.

Figure 8:
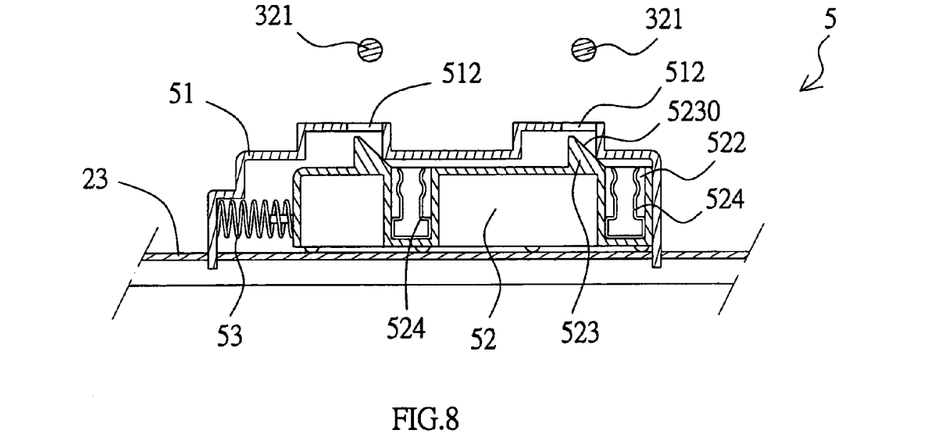
FIG. 8 is a plan cross-sectional assembly view of an electric cooking apparatus in accordance with another embodiment of the present invention.

Referring to FIG. 8 with reference to FIGS. 1 and 2, in accordance with another embodiment of the present invention, the socket 5 is mounted on the bottom plate 23 of the outer pot body 2 and connected to the conducting terminals 321 of the electric heating member 32 of the inner pot body 3. The socket 5 is connected to a surrounding electric power supply (not shown) and includes a housing 51 secured on the bottom plate 23 of the outer pot body 2, a movable member 52 movably mounted in the housing 51, and an elastic biasing member 53. The housing 51 of the socket 5 is made of insulating material and formed with two insertion holes 512 aligning with the conducting terminals 321 of the electric heating member 32. The movable member 52 of the socket 5 is formed with two slots 522 aligning with the insertion holes 512 of the housing 51. Each of the two slots 522 of the movable member 52 is provided with an electric contact 524 connected to the electric power supply. Each of the two slots 522 of the movable member 52 has a side provided with a guide block 523 for guiding movement of each of the conducting terminals 321 of the electric heating member 32. The guide block 523 of each of the two slots 522 of the movable member 52 has a side formed with a ramp 5230 to guide movement of each of the conducting terminals 321 of the electric heating member 32. The elastic biasing member 53 of the socket 5 is a coil spring mounted between the housing 51 and the movable member 52. Thus, as shown in FIG. 8, the movable member 52 of the socket 5 is pushed by an elastic force of the elastic biasing member 53 to move to a shielding position where the slots 522 of the movable member 52 are separated from the insertion holes 512 of the housing 51, so that the insertion holes 512 of the housing 51 are closed by a wall of the movable member 52, thereby preventing a foreign object from entering the two slots 522 of the movable member 52 from the insertion holes 512 of the housing 51.

Figure 9:
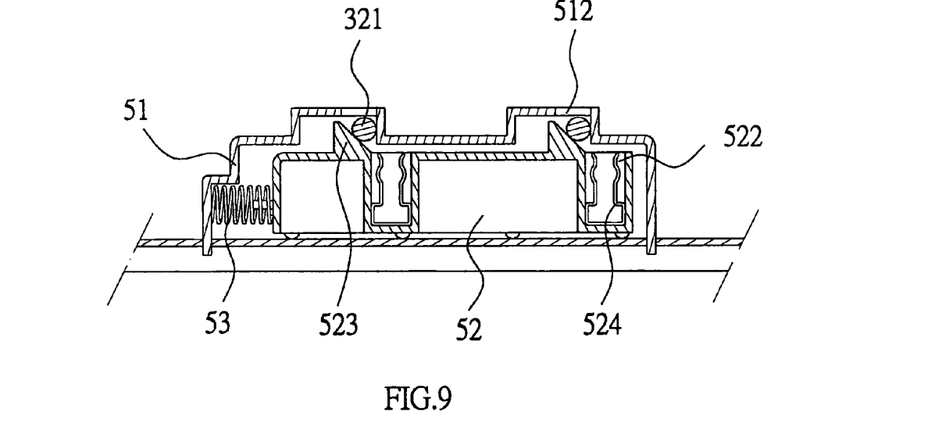
FIG. 9 is a schematic operational view of the electric cooking apparatus as shown in FIG. 8.

As shown in FIG. 9, when the conducting terminals 321 of the electric heating member 32 of the inner pot body 3 approach the socket 5, the conducting terminals 321 of the electric heating member 32 are inserted into the insertion holes 512 of the housing 51 and pressed on the guide blocks 523 of the movable member 52 to push the movable member 52 to move against the restoring force of the elastic biasing member 53 until the slots 522 of the movable member 52 are aligned with the insertion holes 512 of the housing 51.

Figure 10:
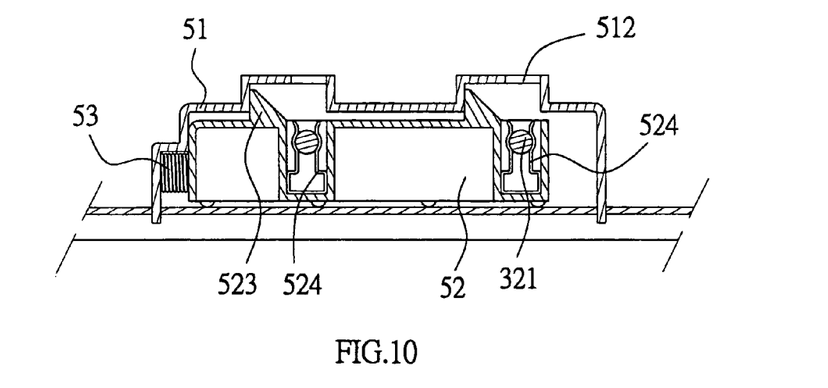
FIG. 10 is a schematic operational view of the electric cooking apparatus as shown in FIG. 9.

As shown in FIG. 10, when the slots 522 of the movable member 52 are aligned with the insertion holes 512 of the housing 51, the conducting terminals 321 of the electric heating member 32 are inserted into the slots 522 of the movable member 52 to contact the electric contacts 524 of the movable member 52, thereby electrically connecting the inner pot body 3 to the socket 5. At this time, the conducting terminals 321 of the electric heating member 32 force the electric contacts 524 of the movable member 52 to further move against the restoring force of the elastic biasing member 53 successively so as to adjust the relative position between the conducting terminals 321 of the electric heating member 32 and the electric contacts 524 of the movable member 52. Thus, the electric contacts 524 of the movable member 52 are in close contact with the conducting terminals 321 of the electric heating member 32 by the restoring force of the elastic biasing member 53, thereby enhancing the electric conducting and heating effect of the electric heating member 52.

Accordingly, when the conducting terminals of the electric heating member are inserted into the socket, the electric contacts of the movable member of the socket are in close contact with the conducting terminals of the electric heating member by the restoring force of the elastic biasing member, thereby enhancing the electric conducting and heating effect of the electric heating member.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An electric cooking apparatus, comprising:
   an outer pot body;
   an inner pot body mounted in the outer pot body and provided with an electric heating member having two conducting terminals;
   a socket mounted in the outer pot body and including a housing secured on the outer pot body and formed with two insertion holes aligning with the conducting terminals of the electric heating member of the inner pot body, a movable member movably mounted in the housing, two electric contacts mounted on the movable member, and an elastic biasing member mounted between the housing and the movable member to push the movable member;
   characterized in that: the electric contacts are secured on the movable member to move therewith, the conducting terminals of the electric heating member are inserted through the insertion holes of the housing and are electrically connected to the electric contacts when the electric contacts are movable with the movable member to align with the insertion holes of the housing, and the conducting terminals of the electric heating member are in close contact with the electric contacts of the socket by an elastic force of the elastic biasing member applied on the movable member.

2. The electric cooking apparatus in accordance with claim 1, wherein the movable member of the socket is formed with two slots to receive the electric contacts.

3. The electric cooking apparatus in accordance with claim 2, wherein each of the two slots of the movable member is movable to align with the insertion holes of the housing.

4. The electric cooking apparatus in accordance with claim 1, wherein the inner pot body has a bottom provided with a push lever, the housing of the socket is formed with an opening aligning with the push lever of the inner pot body, and the movable member of the socket is formed with a guide hole that is movable to align with the opening of the housing.

5. The electric cooking apparatus in accordance with claim 4, wherein the guide hole of the movable member of the socket has a side provided with a guide block for guiding movement of the push lever of the inner pot body.

6. The electric cooking apparatus in accordance with claim 5, wherein the guide block of the movable member has a side formed with a ramp.

7. The electric cooking apparatus in accordance with claim 5, wherein the push lever is inserted into the opening of the housing and pressed on the guide block of the movable member to push the movable member to move toward the elastic biasing member.

8. The electric cooking apparatus in accordance with claim 2, wherein the movable member of the socket is pushed by an elastic force of the elastic biasing member to move to a shielding position where the slots of the movable member are separated from the insertion holes of the housing, so that the insertion holes of the housing are closed by a wall of the movable member.

9. The electric cooking apparatus in accordance with claim 1, further comprising a bottom plate mounted in the outer pot body for supporting the socket.

10. The electric cooking apparatus in accordance with claim 2, wherein at least one of the two slots of the movable member has a side provided with a guide block for guiding movement of each of the conducting terminals of the electric heating member.

11. The electric cooking apparatus in accordance with claim 10, wherein the guide block of each of the two slots of the movable member has a side formed with a ramp to guide movement of each of the conducting terminals of the electric heating member.

12. The electric cooking apparatus in accordance with claim 10, wherein the conducting terminals of the electric heating member are inserted into the insertion holes of the housing and pressed on the guide blocks of the movable member to push the movable member to move toward the elastic biasing member.

* * * * *